(12) United States Patent
Circosta et al.

(10) Patent No.: US 12,361,143 B2
(45) Date of Patent: Jul. 15, 2025

(54) PROVIDING USER INFORMATION IN ASSOCIATION WITH MESSAGING

(71) Applicant: Apple Inc., Cupertino, CA (US)

(72) Inventors: Nicholas J. Circosta, Mountain View, CA (US); Bhaskar P. Sarma, Santa Clara, CA (US); Lemont A. Washington, San Francisco, CA (US); Yannick L. Sierra, San Francisco, CA (US); Roberto Garcia, Santa Clara, CA (US); Adam T. Binsz, San Francisco, CA (US); Lilynaz A. Hashemi, San Francisco, CA (US); Pierre J. De Filippis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1052 days.

(21) Appl. No.: 16/888,574

(22) Filed: May 29, 2020

(65) Prior Publication Data

US 2020/0380143 A1    Dec. 3, 2020

Related U.S. Application Data

(60) Provisional application No. 62/855,846, filed on May 31, 2019.

(51) Int. Cl.
*G06F 21/60* (2013.01)
*H04L 9/14* (2006.01)
(Continued)

(52) U.S. Cl.
CPC .............. *G06F 21/602* (2013.01); *H04L 9/14* (2013.01); *H04L 9/3242* (2013.01); *H04L 51/04* (2013.01); *G06F 21/6218* (2013.01)

(58) Field of Classification Search
CPC ..... G06F 21/602; G06F 21/6218; H04L 9/14; H04L 9/3242; H04L 51/04; H04L 51/063;
(Continued)

(56) References Cited

U.S. PATENT DOCUMENTS

| 6,292,795 B1 * | 9/2001 | Peters | G06F 16/9017 |
| | | | 707/999.005 |
| 7,437,549 B2 * | 10/2008 | Lindqvist | H04L 67/306 |
| | | | 348/E7.071 |

(Continued)

FOREIGN PATENT DOCUMENTS

| CN | 108028834 A | 5/2018 |
| CN | 108292323 A | 7/2018 |

(Continued)

OTHER PUBLICATIONS

CN_108369697_A_Issuing System and Method Based on the Authorization Certificate of the Block Chain and BasedOn Block the Chain of Authorization Certificate Authentication System and Method (Machine Translation) by UHR, Joon-Sun; Hong, Jay-Wu and Song, Joo-Han; pp. 26 Date Published: Aug. 3, 2018.*

(Continued)

*Primary Examiner* — Ali H. Cheema
(74) *Attorney, Agent, or Firm* — BAKERHOSTETLER

(57) ABSTRACT

A device implementing a system for providing information corresponding to a user in association with messaging includes a processor configured to receive, by a messaging application on the device, a message and associated metadata from a second device, the associated metadata comprising a record identifier of a data record stored on a server, the data record comprising identifying information corresponding to a user of the second device. The processor is further configured to send, to the server, a request for the data record, the request comprising the record identifier, and obtain, in response to the sending, the data record. The (Continued)

processor is further configured to display the identifying information of the user contained in the data record, together with content of the message in a user interface of the messaging application.

21 Claims, 8 Drawing Sheets

(51) Int. Cl.
    *H04L 9/32*     (2006.01)
    *H04L 51/04*     (2022.01)
    *G06F 21/62*     (2013.01)

(58) Field of Classification Search
    CPC ..... H04L 12/1822; H04L 12/40; H04L 67/10;
          H04L 67/61; H04L 67/306; H04L 51/10;
          H04L 51/18; H04L 51/08; H04L 51/216;
          H04L 51/42
    USPC ......................................................... 713/193
    See application file for complete search history.

(56) References Cited

U.S. PATENT DOCUMENTS

| | | | | |
|---|---|---|---|---|
| 7,849,419 | B2 * | 12/2010 | Tudor | G06F 9/451 |
| | | | | 715/733 |
| 10,552,858 | B1 * | 2/2020 | Winner | G06Q 30/0242 |
| 2015/0347368 | A1 * | 12/2015 | Carlen | H04L 51/08 |
| | | | | 715/230 |
| 2016/0092580 | A1 * | 3/2016 | Komeili | G06Q 10/10 |
| | | | | 707/722 |
| 2016/0099892 | A1 * | 4/2016 | Palakovich | H04L 51/04 |
| | | | | 709/206 |
| 2016/0142350 | A1 | 5/2016 | Mutha et al. | |
| 2016/0149848 | A1 * | 5/2016 | Vembu | H04L 51/216 |
| | | | | 709/206 |
| 2016/0226804 | A1 | 8/2016 | Hampson et al. | |
| 2017/0357442 | A1 | 12/2017 | Peterson | |
| 2018/0152461 | A1 * | 5/2018 | Albisu | H04L 63/14 |
| 2018/0212903 | A1 * | 7/2018 | Rose | H04L 12/1822 |
| 2019/0370687 | A1 * | 12/2019 | Pezzillo | H04L 67/10 |
| 2019/0386945 | A1 * | 12/2019 | Wills | H04L 51/42 |
| 2020/0036783 | A1 * | 1/2020 | Bourassa | G06F 16/90335 |
| 2020/0120184 | A1 * | 4/2020 | Zhang | H04L 67/61 |
| 2020/0126106 | A1 * | 4/2020 | Winner | G06Q 50/01 |

FOREIGN PATENT DOCUMENTS

| | | | | | |
|---|---|---|---|---|---|
| CN | | 108369697 A | * | 8/2018 | ........... H04L 9/0637 |
| CN | | 109471844 A | * | 3/2019 | ........... G06F 21/602 |
| EP | | 3422666 A1 | * | 1/2019 | ............. H04L 12/40 |
| JP | | 2021510883 A | * | 4/2021 | ............. H04L 51/04 |
| WO | WO 2017/039785 | | | 3/2017 | |
| WO | WO 2017/120087 | | | 7/2017 | |

OTHER PUBLICATIONS

CN_109471844_A_File Sharing Method, Device, Computer Device and Storage Medium (Machine Translation) by Sun, Ya-zhou; Du, Xiao-Jun; Guo, Yu-shun, Chen, Bin and Chen, Jie pp. 20; Date Published: Mar. 15, 2019.*
Invitation to Pay Additional Fees from PCT/US2020/035436, dated Sep. 14, 2020, 12 pages.
International Search Report and Written Opinion from PCT/US2020/035436, dated Nov. 4, 2020, 16 pages.
Chinese Office Action from Chinese Patent Application No. 202080039784.2, dated Dec. 28, 2024, 13 pages with English language translation.
Chinese Office Action from Chinese Patent Application No. 202080039784.2, dated Aug. 17, 2024, 13 pages including English language translation.
European Office Action from European Patent Application No. 20747169.9, dated Jul. 18, 2024, 4 pages.

* cited by examiner

PROVIDING USER INFORMATION IN ASSOCIATION WITH MESSAGING

CROSS REFERENCE TO RELATED APPLICATIONS

This application claims the benefit of priority to U.S. Provisional Patent Application No. 62/855,846, entitled "Providing User Information in Association with Messaging," and filed on May 31, 2019, the disclosure of which is hereby incorporated herein in its entirety.

TECHNICAL FIELD

The present description relates generally to messaging, including providing user information in association with messaging.

BACKGROUND

Messaging applications can provide the ability for person-to-person communication for users of electronic devices. Messages with text and/or other content such as images and videos, for example, can be transmitted using messaging applications. Electronic devices such as mobile phones, laptops, computers and smartwatches may be used to participate in electronic messaging. For example, a user of a first device may send content to another user of a second device using a messaging application.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
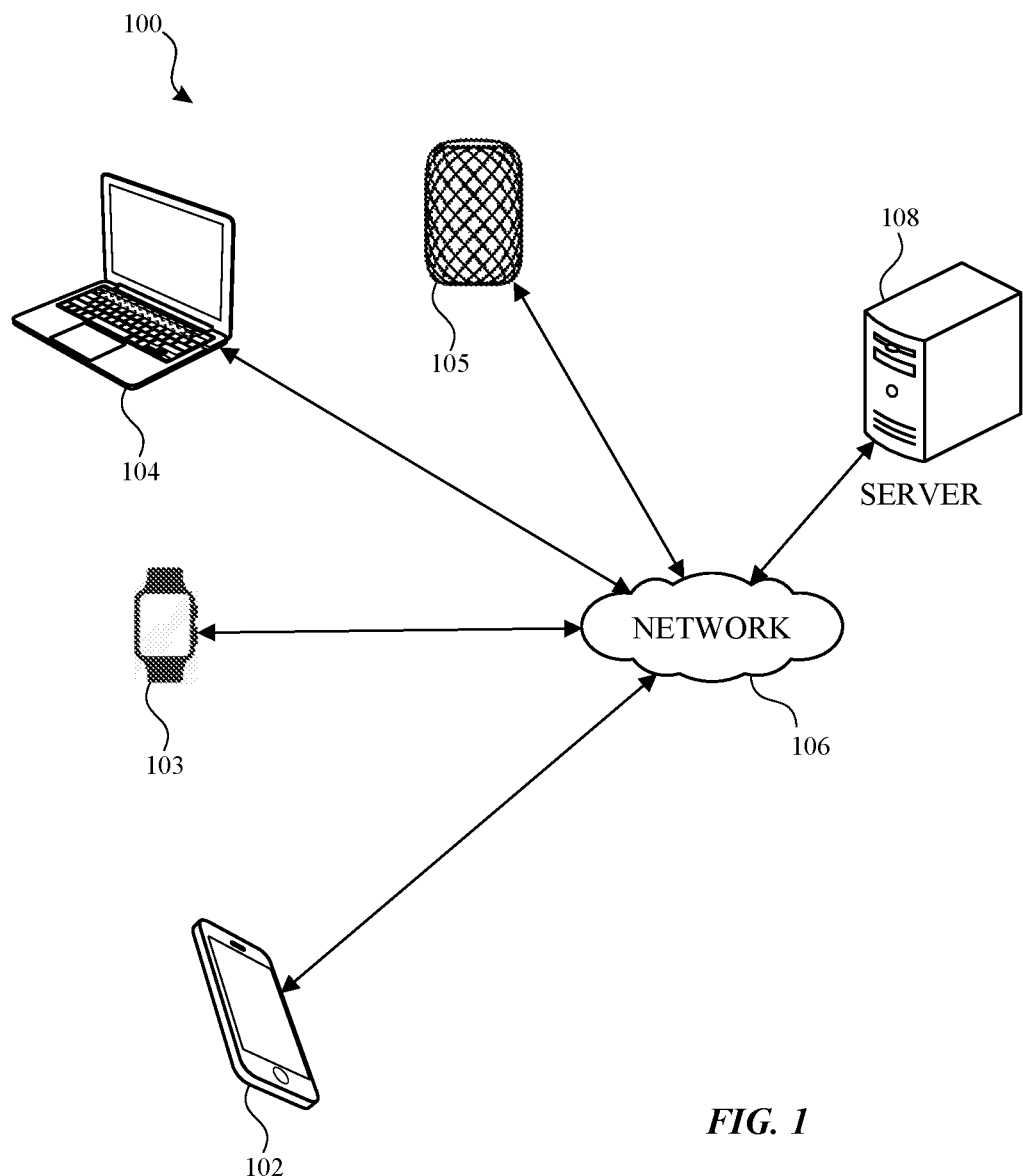
FIG. 1 illustrates an example network environment for providing information corresponding to a user in association with messaging in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as mobile phones, laptops, computers and smartwatches may be used to participate in electronic messaging. For example, a user of a device may send content to other users of other devices using messages transmitted via a messaging application. Moreover, the user may select information to personally identify himself/herself to other users, e.g. within the messaging application, such as a name (e.g., a nickname) and/or an image, such as a photo, video, animation, avatar, etc. The subject system allows the user's device to securely propagate the user's selected identifying information (e.g., a name and/or image of a user) to other users' device(s) using a cloud storage service in conjunction with messages being transmitted via the messaging application, without significantly increasing the size of the messages being transmitted.

In the subject system, the user's identifying information may be encrypted and stored on a server, such as via a cloud storage service. The user's device may then append a small amount of metadata (e.g., 16 bytes, 32 bytes, or any number of bytes) to outbound messages transmitted via the messaging application to other users' devices. The metadata may include information for retrieving the user's encrypted identifying information from the server (e.g., a record identifier), as well as a key for decrypting the encrypted identifying information. Thus, upon receiving a message from the user's device, a receiving device can retrieve the user's encrypted identifying information from the server using the record identifier included in the metadata, and can decrypt the user's encrypted identifying information using the key included in the metadata.

In this manner, the subject system allows a user to securely propagate their identifying information (including, e.g., images, videos, animations, etc.) to other users via messaging without significantly impacting the size of the messages being transmitted. Furthermore, in one or more implementations, the value of the record identifier that the receiving device uses to retrieve the user's identifying information from the server may also serve as a hash value that can be used by the receiving device to verify the integrity of the user's identifying information. In this manner, the subject system also allows a receiving device to verify the integrity of the user's identifying information without incurring additional impact on the size of the messages being transmitted.

FIG. 1 illustrates an example network environment 100 for providing user information in association with messaging in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104 and 105 (hereinafter 102-105), a network 106 and a server 108. The network 106 may communicatively (directly or indirectly) couple, for example, any two or more of the electronic devices 102-105 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-105 and a single server 108; however, the network environment 100 may include any number of electronic devices and any number of servers.

One or more of the electronic devices 102-105 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smartwatch, the electronic device 104 is depicted as a laptop computer, and the electronic device 105 is depicted as a smart speaker. Each of the electronic devices 102-105 may be, and/or may include all or part of, the device discussed below with respect to FIG. 2, and/or the electronic system discussed below with respect to FIG. 8.

The electronic devices 102-105 may be configured to send electronic messages between each other via a messaging application (e.g., an email application, a text messaging application, an instant messaging application) running on the respective electronic devices 102-105. Moreover, the server 108 may be configured to securely store encrypted identifying information (e.g., name and/or image data) of the users of the electronic devices 102-105, in association with cloud-based user accounts of the users. For example, a first user of the electronic device 102 may opt to share the identifying information with a second user of the electronic device 103 in association with messaging. The electronic device 103 may access the identifying information (e.g., from the server 108) and display the identifying information (e.g., name and/or image) of the first user, for example, within a user interface of the messaging application.

The server 108 may be, and/or may include all or part of the device discussed below with respect to FIG. 2, and/or the electronic system discussed below with respect to FIG. 8. The server 108 may include one or more servers, such as a cloud of servers, that may be used to store data records which include identifying information (e.g., encrypted information fields) corresponding to users of one of more of the electronic devices 102-105. For explanatory purposes, a single server 108 is shown and discussed with respect to various operations. However, these and other operations discussed herein may be performed by one or more servers, and each different operation may be performed by the same or different servers.

Figure 2:
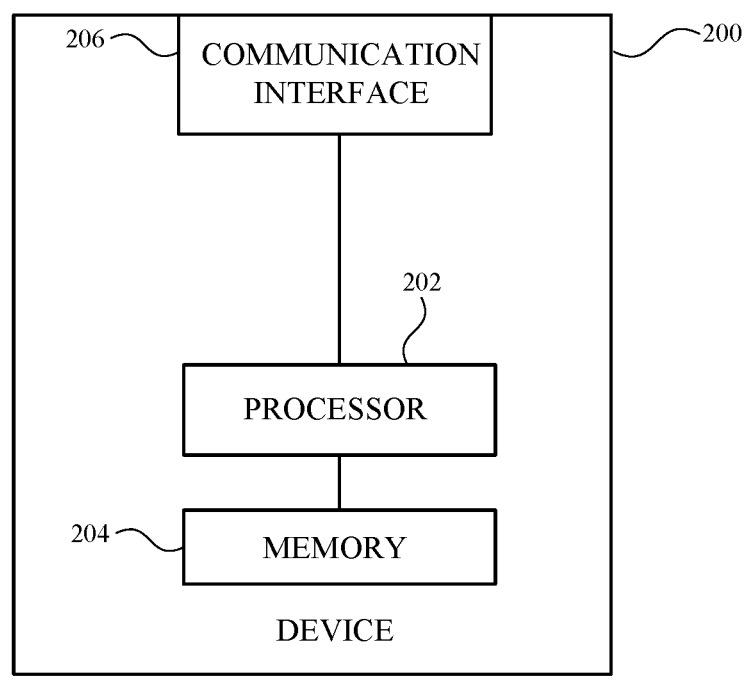
FIG. 2 illustrates an example device that may implement a system for providing user information in association with messaging in accordance with one or more implementations.

FIG. 2 illustrates an example device 200 that may implement a system for providing user information in association with messaging in accordance with one or more implementations. For example, the device 200 of FIG. 2 can correspond to any of the electronic devices 102-105 and/or the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one or more of the electronic devices 102-105, the memory 204 may store code corresponding to a messaging application (e.g., an email application, a text messaging application, an instant messaging application, an operating system-level messaging application, or another type of application which provides for electronic messaging between devices). Moreover, in a case where the device 200 corresponds to the server 108, the memory 204 may store one or more data records which include encrypted identifying information (e.g., name data, image data) for respective users of the electronic devices 102-105.

The communication interface 206 may include suitable logic, circuitry, and/or code that enables wired or wireless communication, such as between any of the electronic devices 102-105 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
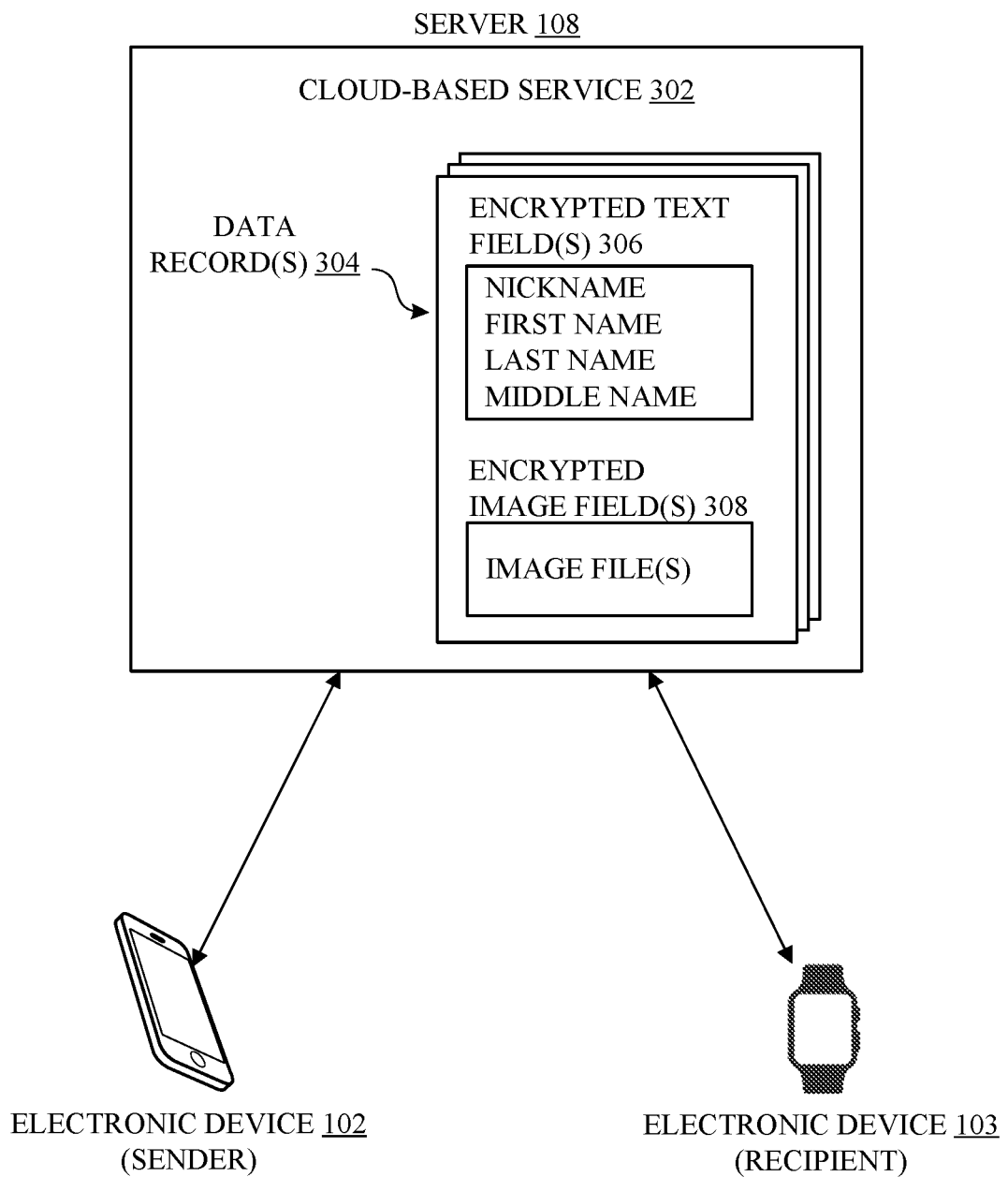
FIG. 3 illustrates an example of a cloud-based service that may be implemented by a server in accordance with one or more implementations.

FIG. 3 illustrates an example of a cloud-based service 302 that may be implemented by the server 108 in accordance with one or more implementations. For example, the cloud-based service 302 can be implemented by one or more software modules running on the processor 202 of the server 108 and/or any other device. In another example, the cloud-based service 302 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the cloud-based service 302 provides for users of the electronic devices 102-105 to securely store, maintain and access user content. The cloud-based service 302 may provide users (e.g., of the electronic devices 102-105) with respective user accounts, in order to securely store, maintain and access their respective content.

In one or more implementations, the cloud-based service 302 may be configured to store one or more data record(s) 304, which contain encrypted identifying information corresponding to respective user(s). Each of the data record(s) 304 may include encrypted text field(s) 306 and/or encrypted image field(s) 308 that may be used to identify a particular user. For example, the encrypted text field(s) 306 may include name information (e.g., one or more of a nickname, first name, last name and/or middle name), and the encrypted image field(s) may include one or more photos, videos and/or animations corresponding to a user. The encrypted text field(s) 306 and/or the encrypted image field(s) 308 may include information provided to the cloud-based service 302 by one of the electronic devices 102-105.

For example, a user of the electronic device 102 may have selected or otherwise updated a name (e.g., a nickname) and/or an image (e.g., photo, video, animation) at the electronic device 102. The user may have opted to share the selected name and/or image with another user (e.g., of the electronic device 103). Thus, the electronic device may 102 be configured to store a data record on the cloud-based service 302 at a location identified by a data record identifier, where the data record 304 includes the encrypted text field(s) 306 (e.g., corresponding to the name) and/or the encrypted image field(s) 308 (e.g., corresponding to the image). In one or more implementations, the electronic device 102 may store multiple data records 304, where each data record corresponds to a different profile used by the user (e.g., respective data records corresponding to a business profile, a family profile, a friends profile, and the like).

As discussed below with respect to FIG. 4, the electronic device 102 may send the record identifier, and a key for decrypting the information field(s) of the data record 304, to the electronic device 103, for example, as metadata associated with a message sent by the electronic device 102 to the electronic device 103. Using the record identifier and the key, the electronic device 103 may access the stored, text field(s) 306 and/or the image field(s) 308 from the cloud-based service 302, and display the corresponding name and/or image of the user of the electronic device 102, such as within a messaging application running on the electronic device 103, and/or within an address book or contact list.

In one or more implementations, the cloud-based service 302 may be implemented via software instructions, stored in the memory 204, which when executed by the processor 202, cause the processor 202 to perform particular function (s). In one or more implementations, the cloud-based service 302 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
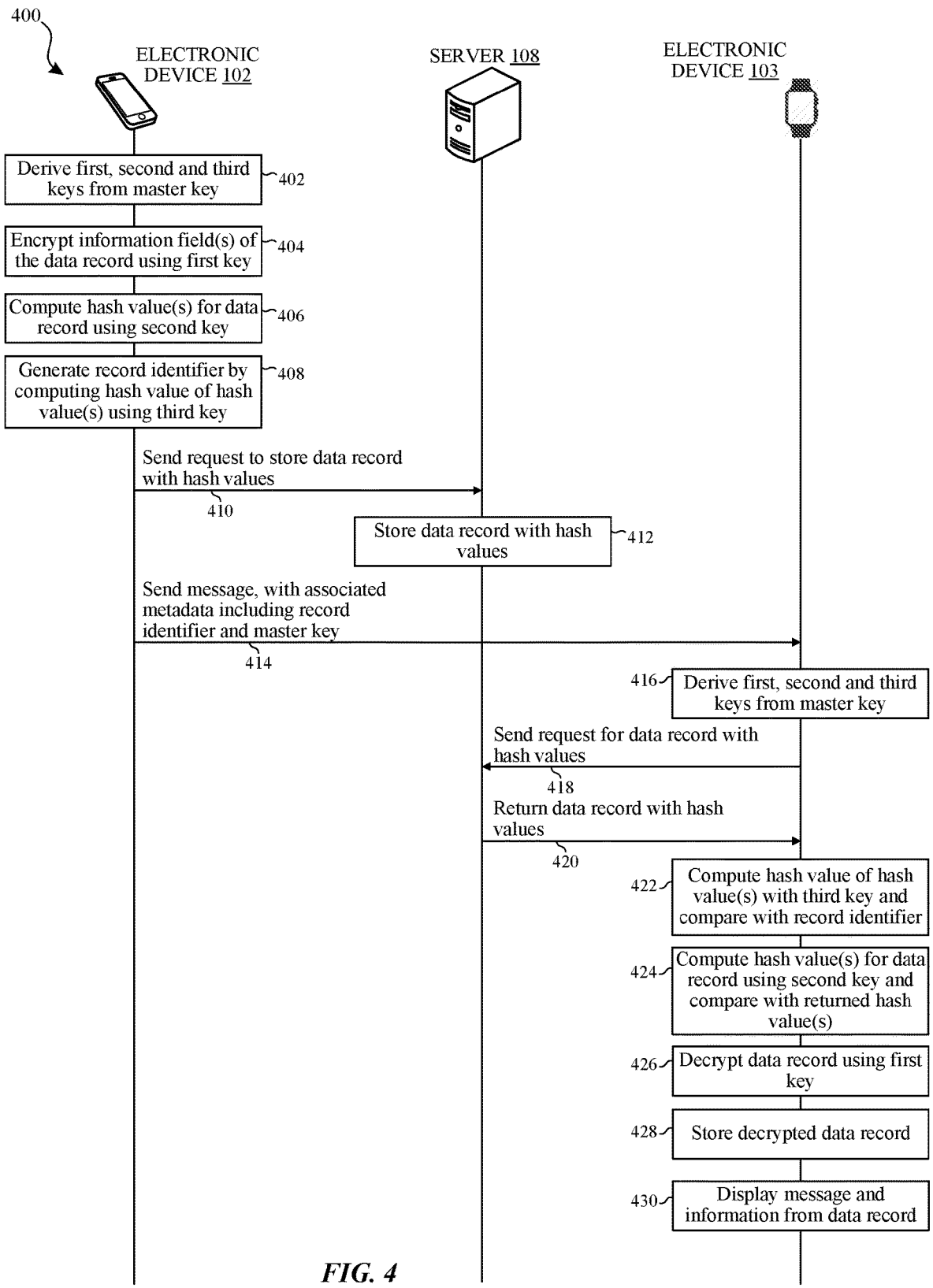
FIG. 4 illustrates an example process for providing user information in association with messaging in accordance with one or more implementations.

FIG. 4 illustrates an example process 400 for providing user information in association with messaging in accordance with one or more implementations. For explanatory purposes, the process 400 is primarily described herein with reference to the electronic devices 102-103 and the server 108 of FIG. 1. However, the process 400 is not limited to the electronic devices 102-103 and the server 108 of FIG. 1, and one or more blocks (or operations) of the process 400 may be performed by one or more other components and/or other suitable devices (e.g., any of the electronic devices 102-105). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

As noted above, the subject system provides for a user of the electronic device 102 to select and/or update identifying information (e.g., a name and/or image for use with a business profile, family profile, friends profile or the like) that may be used, for example, within messaging. In one or more implementations, such selection and/or update of the identifying information may trigger the electronic device 102 to initiate upload of a data record 304 to a server, corresponding to operations 410-412 of the process 400. In one or more implementations, the server may store multiple different data records 304 for the user of the electronic device 102, such as a different record each time the user updates their identifying information. In one or more implementations, the server may store a single data record 304 for the user, such that the prior data record is replaced on the server with an updated data record 304 each time the user updates/changes their identifying information.

Moreover, the operations 414-430 may correspond with the electronic device 102 sending a message to a receiving device (e.g., the electronic device 103). The message may be sent together with a record identifier usable by the electronic device 103 to retrieve the data record 304, and a key usable by the electronic device 103 to decrypt the encrypted information field(s) of the data record 304. The electronic device 103 may display the corresponding identifying information within a user interface of the messaging application.

At operation 402, the electronic device 102 derives first, second and third keys from a master key. The master key may correspond to a key (e.g., of 16 bytes in size) generated by the electronic device 102 for verifying and/or decrypting the data record 304. The electronic device 102 may derive the first, second and third keys by calling an HKDF function (e.g., a key derivation function based on hash-based message authentication code (HMAC)), using the master key and a predefined string (e.g., "nicknames" or another predefined string) as input. For example, the first key may correspond to a first 16 bytes, the second key may correspond to a second 16 bytes and the third key may correspond to a third 16 bytes of the key provided by the HKDF function call (e.g., where the HKDF is configured to extract and expand the number of bytes relative to the original master key of 16 bytes). As described herein, the first, second and third keys may be used for verification and/or encryption of the data record and its information fields (e.g., the encrypted text field(s) 306 and/or the encrypted image field(s) 308).

At operation 404, the electronic device 102 encrypts the information field(s) of the data record 304 using the first key derived from the master key. In one or more implementations, for each information field (e.g., each of the encrypted text field(s) 306 and/or image field(s) 308), the electronic device 102 may encrypt the information field by generating a random initial value (e.g., a random 96 bit IV_i value) and computing cipher text using the first key. Thus, each of the information field(s) may be separately encrypted using the first key.

At operation 406, the electronic device 102 computes a hash value for each of the encrypted information fields using the second key. In one or more implementations, for each of the encrypted information fields, the respective hash value may be computed using a hash-based message authentication code (HMAC) function based on the second key. For example, the HMAC function may be performed based on a combination (e.g., concatenation) of the fieldname (e.g., "nickname," "first name," "last name," "middle name" or "image"), a random 96 bit IV_i value, and cipher text of the respective information field (e.g., the encrypted data for the field).

At operation 408, the electronic device 102 generates a record identifier for the data record by computing a hash value of the combined hash values (from operation 406), using the third key. In one or more implementations, the electronic device 102 combines (e.g., concatenates) the hash values computed at operation 406, and computes an additional hash value on the combined hash values using an HMAC function based the third key. The electronic device 102 generates a record identifier that is based on, such as equal to, the additional hash value. In one or more implementations, the record identifier may be limited to 16 bytes in size.

At operation 410, the electronic device 102 sends, to the server 108, a request to store a data record that includes the encrypted identifying information and the hash values. In one or more implementations, the electronic device 102 sends each of the random initial value (e.g., the 96 bit IV_i value), the cipher text corresponding to each encrypted information field (e.g., the encrypted text field(s) 306 and/or image field(s) 308 as encrypted) and the hash values for each of the information fields. The request to store the data record 304 may include the record identifier (e.g., corresponding to the additional hash value), which indicates to the server 108 the address at which the data record and hash values are to be stored.

At operation 412, the server stores the data record together with the hash values. In one or more implementations, the cloud-based service 302 of the server 108 is configured to store the data record at an address corresponding to the record identifier provided by the electronic device 102. Moreover, the stored data record may include the random initial value (e.g., the 96 bit IV_i value), the cipher text corresponding to each encrypted information field (e.g., the encrypted text field(s) 306 and/or image field(s) 308 as encrypted) and the hash values for each of the information fields, as provided by the electronic device 102. The data record may be associated with a cloud-based user account (e.g., as provided by the cloud-based service 302) for the user of the electronic device 102.

At operation 414, the electronic device 102 sends a message to the electronic device 103, together with associated metadata including the record identifier and the master key. As described herein, the electronic device 103 may use the record identifier to retrieve the data record from the server 108, may use the record identifier for verifying the user identifying information, and may use the master key for decrypting the encrypted user identifying information in the retrieved data record, in order to display the identifying information of the sending user on the electronic device 103.

The message and associated metadata may be sent by the electronic device 102 to the electronic device 103 via a messaging application that is running on each of the electronic devices 102-103. The messaging application may be one or more of an instant messaging application, an email application, a text messaging application, or another type of application which provides for electronic messaging between the electronic devices 102-103. The messaging application (e.g., instant messaging, email, text message) may be the same, or may be different, for the electronic devices 102-103.

In one or more implementations, the electronic device 102 may be configured to send the associated metadata with the message to the electronic device 103, based on user opt-in at the electronic device 102. For example, one or more of an operating system, the messaging application and/or another application running on the electronic device 102 may provide user interface(s) that allow the user to select and/or update their identifying information (e.g., name data and/or image data). In one or more implementations, the name data may include text input by the user, and the image data may include a photo, video and/or animation provided by the user (e.g., based on user selection of the image and/or an image captured by a camera of the electronic device 102).

The electronic device 102 may further include user interface(s) that provide for the sending user to designate receiving users (e.g., messaging participants, such as contacts of the sending user) authorized to receive the identifying information of the sending user. Moreover, the electronic device 102 may include user interface(s) that provide for the sending user to designate which data record (e.g., corresponding to a business profile, family profile, friend profile, or the like) to provide to receiving users. In this manner, the user of the electronic device 102 may selectively share his/her identifying information (e.g., name and/or photo) with the electronic device 103 (e.g., corresponding to a receiving user). In one or more implementations, the electronic device 102 may prompt the user to share the identifying information with not-yet-authorized recipients, where the prompt is displayed when sending a message to a recipient who has not yet been authorized by the sender to receive the identifying information.

As noted above, the record identifier and the master key may be sent as metadata associated with a message. The record identifier and the master key may be limited in size (e.g., 16 bytes each, for 32 bytes total), for example, to reduce the amount of data required to send each message while conveying information for accessing the user's encrypted identifying information. Alternatively or in addition, the electronic device 102 may limit the amount of sent data by sending the associated metadata on a periodic basis, as opposed sending the metadata with every message provided by the electronic device 102. For example, the messaging application running on the electronic device 102 may provide for the associated metadata to be sent once per every five messages sent by the electronic device 102 to the electronic device 103.

In one or more implementations, the messaging application running on the electronic device 102 may provide for the associated metadata to be sent as an out-of-band message by the electronic device 102 to the electronic device 103. In this regard, the out-of-band message may correspond to a "silent" message that is sent between the electronic devices 102-103 via the messaging application, but is not displayed in the messaging transcript between the electronic devices 102-103.

In one or more implementations, the electronic device 103 may have previously received the record identifier and master key from the electronic device 102 (e.g., in association with a prior message sent by the electronic device 102). In response to the prior receipt of the information, the electronic device 103 may have existing identifying information of the sending user stored on the electronic device 103. Thus, the electronic device 103 may be configured to compare the record identifier received at operation 414 with a record identifier stored in local memory (e.g., the memory 204), and proceed with validating and retrieving the data record in a case where the record identifiers do not match (e.g., since a match may suggest that the identifying information is current and does not need to be updated).

At operation 416, the electronic device 103 derives the first, second and third keys from the master key. In one or more implementations, similar to operation 402, the electronic device 103 may derive the first, second and third keys by calling an HKDF function using the master key and the predefined string (e.g., "nicknames") as input. The first, second and third keys may be used by the electronic device 103 for verification and/or decryption of the data record and its information fields (e.g., the encrypted text field(s) 306 and/or the encrypted image field(s) 308).

At operation 418, the electronic device 103 sends a request, to the server 108 (e.g., the cloud-based service 302), for the data record 304. The request includes the record identifier provided by the electronic device 102. The cloud-based service 302 may access the data record 304 based on the record identifier (e.g., by looking up the data record from a data store at the address corresponding to the record identifier). At operation 420, the cloud-based service 302 provides the data record (e.g., with the identifying information encrypted by the electronic device 102) and the hash values (e.g., as provided by the electronic device 102 to the server at operation 410) to the electronic device 103.

At operation 422, the electronic device 103 uses the third key to compute a hash value for the returned hash values, and compares the computed hash value with the record identifier. In one or more implementations, the computed hash value may correspond to performing a hash operation (e.g., an HMAC function based the third key) on a combination/concatenation of the hash values as retrieved from the cloud-based service 302.

The electronic device 103 may compare the computed hash value with the record identifier (e.g., which as noted above for operation 406, corresponds to an additional hash value of hash values). Thus, the data record may be at least partially verified based on a match between the computed hash value and the record identifier. In case of a mismatch, the electronic device 103 may determine that the data record is not valid, and perform a failure operation (e.g., discontinue from processing the data record and perform any necessary memory cleanup).

At operation 424, the electronic device 103 uses the second key to compute a hash value for each of the encrypted information fields in the data record 304. In one or more implementations, for each of the encrypted information fields, the electronic device 103 may use an HMAC function in conjunction with the second key to compute the respective hash value for the information field. Similar to operation 406, the HMAC function may be based on a combination/concatenation of the fieldname, random 96 bit IV_i value and cipher text of the respective information field.

For each of the encrypted information fields, the electronic device 103 may compare the computed hash value with the respective hash value as retrieved from the cloud-based service 302. Thus, the data record may be at least partially verified based on a match between the respective hash values. In case of a mismatch, the electronic device 103 may determine that the respective information field is not valid, and perform a failure operation (e.g., discontinue from processing the data record and perform any necessary memory cleanup).

In one or more implementations, the electronic device 103 may determine, based on the hash values received from the cloud-based service 302, that one or more of the encrypted information field(s) has changed, while other encrypted information field(s) have not changed, relative to prior versions of the information fields stored on the electronic device 103. Thus, with respect to operation 418 above, the electronic device 103 may initially request only the hash values (e.g., associated with record identifier), and the server 108 may initially return the hash values (e.g., without yet returning the information fields of the data record). The electronic device 103 may perform operations 422 and 424 based on the retrieved hash values as described above. However, in a case of where one or more of the encrypted information field(s) has changed, while other encrypted information field(s) have not changed (e.g., based on the comparison of hash values), the electronic device 103 may be configured to retrieve, from the cloud-based service 302, only those information field(s) of the data record which have changed relative to their prior respective version(s).

At operation 426, the electronic device 103 decrypts the data record using the first key. In one or more implementations, for each encrypted information field of the data record provided by the cloud-based service 302, the electronic device 103 may decrypt the information field using the first key. At operation 428, the electronic device 103 stores the verified decrypted data record (e.g., in local memory of the electronic device 103, such as the memory 204).

At operation 430, the electronic device 103 displays the message and the information from the data record. In one or more implementations, the electronic device 103 displays the identifying information of the user (e.g., corresponding to the encrypted text field(s) 306 and/or image field(s) 308) contained in the data record, together with content of the message in a user interface of the messaging application. For example, the identifying information may be displayed within a predesignated area (e.g., a banner) of the user interface, such that the user at the electronic device 103 may view the sending user's name and/or image in association with a messaging thread.

In one or more implementations, the electronic device 103 may be configured to display the identifying information of the sending user in place of existing identifying information of the sending user stored on the electronic device 103. For example, the electronic device 103 may update the identifying information within a contacts application (e.g., an address book) of the electronic device 103, where the contacts application stores contact information used by one or more applications (e.g., messaging, phone, email, maps). Such updating may be based on the user of the electronic device 103 authorizing to update the identifying information via a user interface. Updating the identifying information (e.g., name and/or image) may cause the messaging application and/or other applications to replace the previously-existing identifying information with the updated identifying information.

Figure 5:
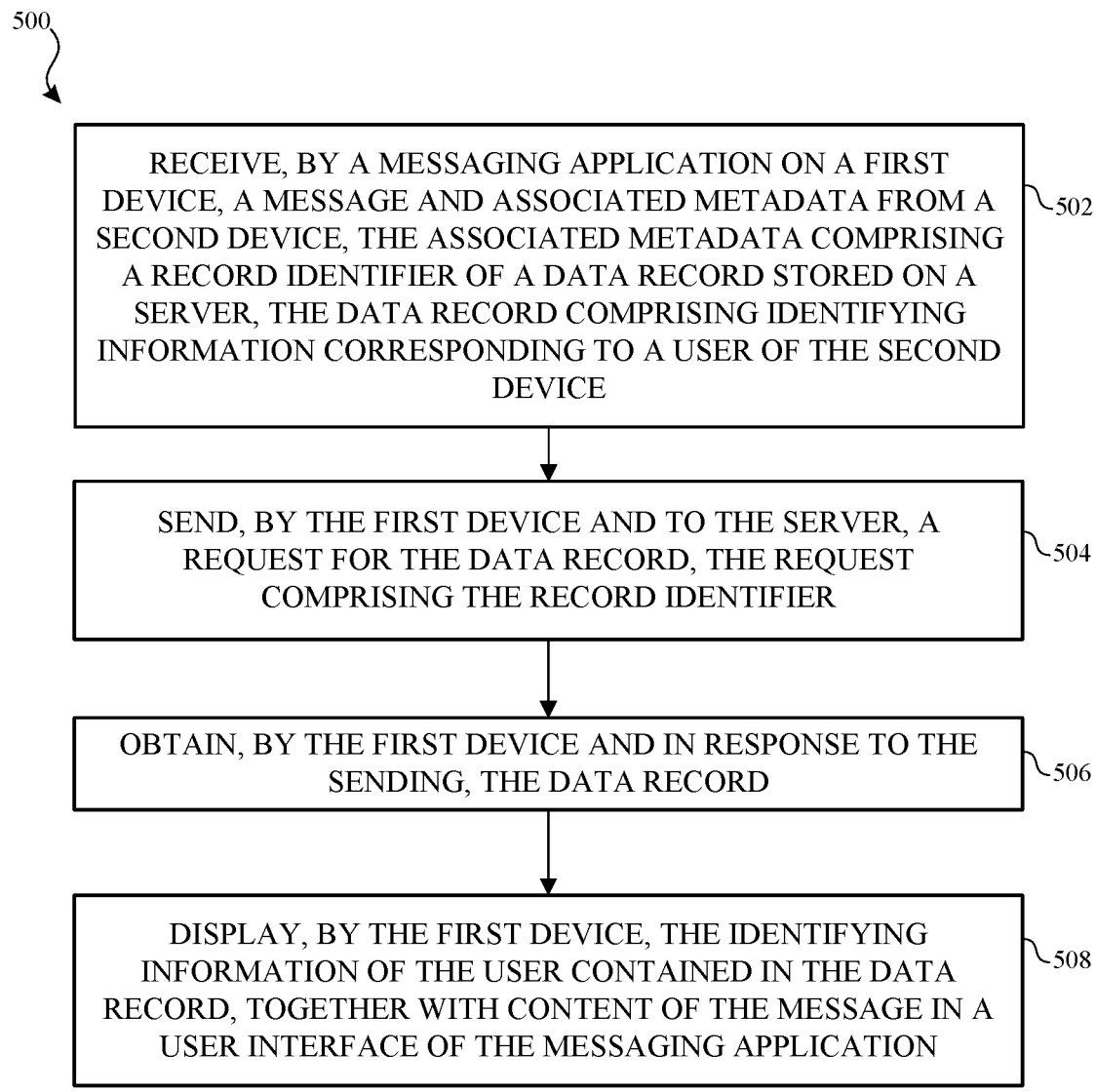
FIG. 5 illustrates a flow diagram of providing user information in association with messaging in accordance with one or more implementations.

FIG. 5 illustrates a flow diagram of providing information corresponding to a user in association with messaging in accordance with one or more implementations. For explanatory purposes, the process 500 is primarily described herein with reference to the electronic devices 102-103 and the server 108 of FIG. 1. However, the process 500 is not limited to the electronic devices 102-103 and the server 108 of FIG. 1, and one or more blocks (or operations) of the process 500 may be performed by one or more other components of the server 108 and other suitable devices (e.g., any of the electronic devices 102-105). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

A messaging application running on the electronic device 103 receives a message and associated metadata from the electronic device 102, the associated metadata including a record identifier of a data record stored on the server 108, the data record including encrypted identifying information corresponding to a user of the electronic device 102 (502). The associated metadata may further include a key for decrypting the encrypted identifying information.

The electronic device 102 may be configured to send the associated metadata with the message to the electronic device 103, such as based on having sent a predetermined number of prior messages to the electronic device 103 without including the associated metadata (e.g., such that the associated metadata is sent once per every five, ten, or any number of sent messages). The electronic device 102 may be configured to send the associated metadata with the message to the electronic device 103, based on user opt-in at the electronic device 102.

The identifying information of the user of the electronic device 102 may include at least one of a name or a photo of the user of the electronic device 102. The name may include at least of a nickname, a first name, a last name or a middle name of the user of the electronic device 102. The data record may be associated with a cloud-based user account for the user of the electronic device 102. In one or more implementations, a cloud-based service 302 may require that a user have an account with the cloud-based service to store a data record, but the cloud-based service 302 may allow users to obtain data records (e.g., containing identifying information of other users) without having an account with the cloud-based service 302. Thus, a user may obtain identifying information of other users from the cloud-based service 302 even if the user does not have an account with the cloud-based service 302.

The electronic device 103 sends a request for the data record, the request including the record identifier (504). In response to the sending, the electronic device 103 obtains the data record (506). In one or more implementations, when the user identifying information is encrypted in the data record, the electronic device 103 may use the key included in the metadata to decrypt the encrypted identifying information.

The electronic device 103 displays the identifying information of the user contained in the data record, together with content of the message in a user interface of the messaging application (508). Displaying the identifying information of the user may include displaying the identifying information of the user in place of existing identifying information of the user stored on the electronic device 103.

Figure 6:
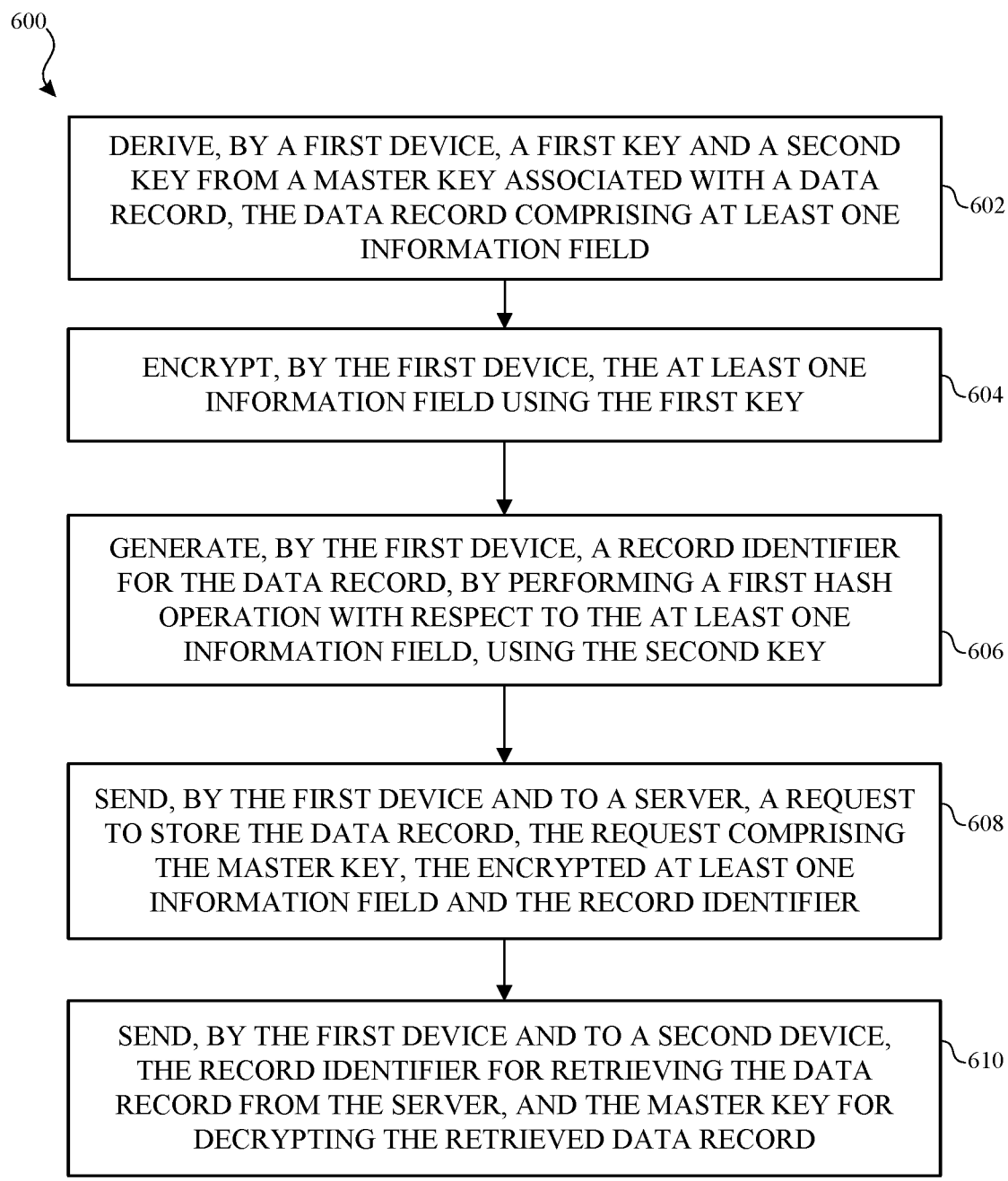
FIG. 6 illustrates a flow diagram of an example process for encrypting user information in a data record in accordance with one or more implementations.

FIG. 6 illustrates a flow diagram of an example process for encrypting identifying information corresponding to a user in a data record in accordance with one or more implementations. For explanatory purposes, the process 600 is primarily described herein with reference to the electronic devices 102-103 and the server 108 of FIG. 1. However, the process 600 is not limited to the electronic devices 102-103 and the server 108 of FIG. 1, and one or more blocks (or operations) of the process 600 may be performed by one or more other components of the server 108 and other suitable devices (e.g., any of the electronic devices 102-105). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 derives a first key and a second key from a master key associated with a data record, the data record including at least one information field (602). The electronic device 102 encrypts the at least one information field using the first key (604).

The electronic device 102 generates a record identifier for the data record, by performing first hash operation with respect to the at least one information field, using the second key (606). Each of the master key and the record identifier may be limited to 16 bytes in size.

The deriving may further include deriving a third key from the master key. Generating the record identifier may further include performing second hash operation with respect to a hash value corresponding to the first hash operation, using the third key. The data record may include a plurality of information fields. The second hash operation may be performed with respect to a plurality of hash values corresponding to the plurality of information fields.

The electronic device 102 sends, to a server (e.g. the server 108), a request to store the data record, the request including the master key, the encrypted at least one information field and the record identifier (608). The electronic device 102 sends, to the electronic device 103, the record identifier for retrieving the data record from the server, and the master key for decrypting the retrieved data record (610).

The electronic device 103 may derive the first and second keys from the master key, and retrieve the data record from the server 108 based on the record identifier. The electronic device 103 may verify the encrypted at least one information field based on the record identifier and based on performing the first hash operation with respect to the at least one information field of the data record, using the second key. The electronic device 103 may decrypt the encrypted at least one information field using the first key.

The electronic device 103 may determine, based on the plurality of hash values, that a first information field of the plurality of information fields has changed and a second information field of the plurality of information fields has not changed relative to prior versions of the first and second information fields stored on the electronic device 103. Thus, when retrieving the information field(s) of the data record, the electronic device 103 may download, from the server, the first information field and refrain from downloading the second information field based on the determining.

The electronic device 102 may send, to the electronic device 103, a message for display within a messaging application of the electronic device 103. The record identifier and the master key may be sent as metadata in association with the message, the message including content that is separate from the data record. The electronic device 103 may provide the at least one information field and the content of the message for display in a user interface of the messaging application.

Figure 7:
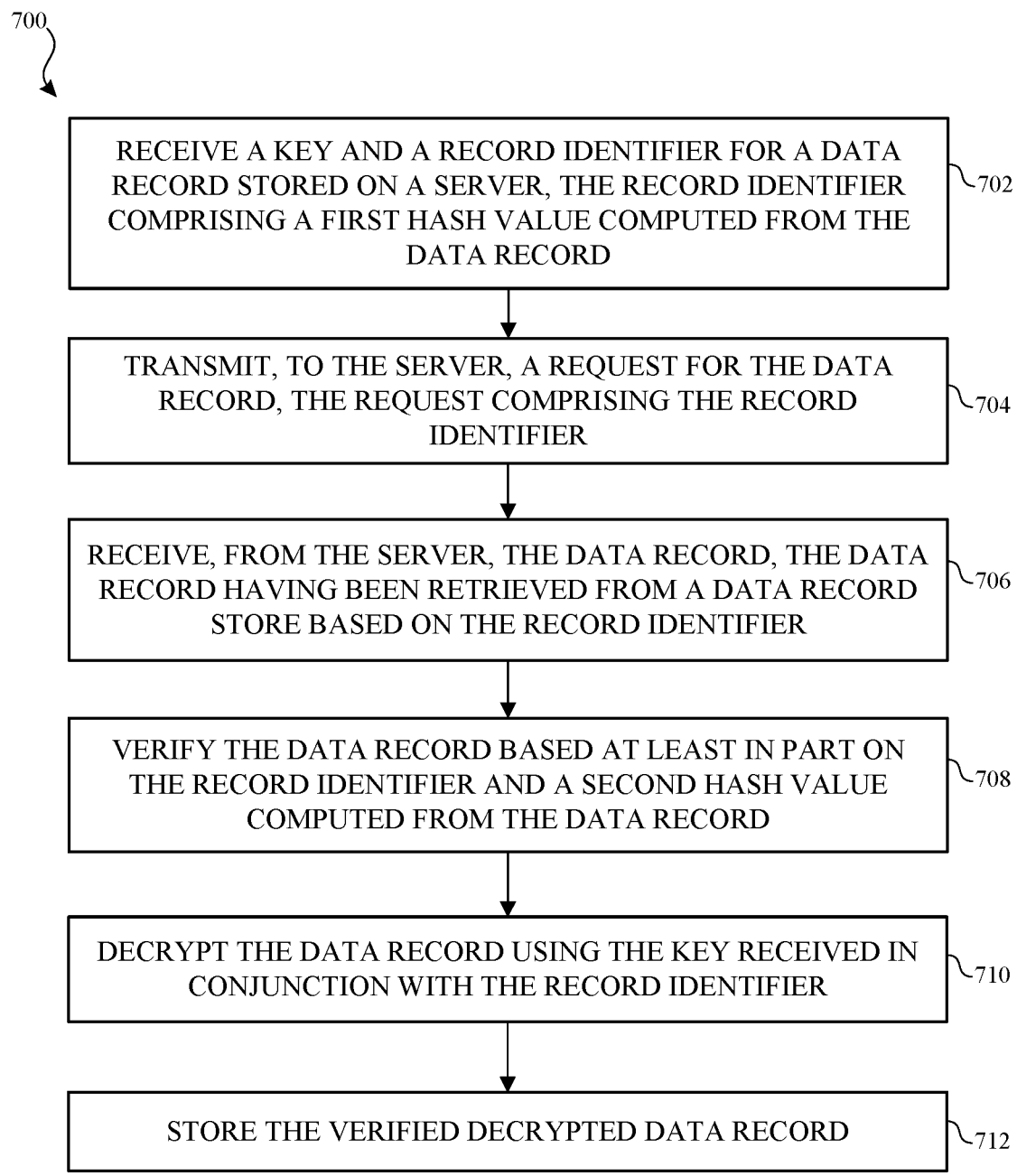
FIG. 7 illustrates a flow diagram of example process for decrypting user information corresponding in a data record in accordance with one or more implementations.

FIG. 7 illustrates a flow diagram of another example process for decrypting information corresponding to a user in a data record in accordance with one or more implementations. For explanatory purposes, the process 700 is primarily described herein with reference to the electronic devices 102-103 and the server 108 of FIG. 1. However, the process 700 is not limited to the electronic devices 102-103 and the server 108 of FIG. 1, and one or more blocks (or operations) of the process 700 may be performed by one or more other components of the server 108 and other suitable devices (e.g., any of the electronic devices 102-105). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 103 receives a key and a record identifier for a data record stored on a server (e.g., the server 108), the record identifier being a first hash value computed from the data record (702). The electronic device 103 transmits, to the server, a request for the data record, the request including the record identifier (704).

The electronic device 103 receives, from the server 108, the data record, the data record having been retrieved from a data record store based on the record identifier (706). The electronic device 103 verifies the data record based at least in part on the record identifier and a second hash value computed from the data record (708). The electronic device 103 decrypts the encrypted information fields of the data record using the key received in conjunction with the record identifier (710). The data record may include a plurality of information fields. Each of the first and second hash values may be computed as a hash of a plurality of hash values corresponding to the plurality of information fields.

The electronic device 103 may determine, based on the plurality of hash values, that a first information field of the plurality of information fields has changed and a second information field of the plurality of information fields has not changed relative to prior versions of the first and second information fields stored on the electronic device 103. The electronic device 103 may download, from the server, the first information field and refrain from downloading the second information field based on the determining.

The electronic device 103 stores the verified decrypted data record (712). The key and the record identifier may be received as metadata in association with a message received from the electronic device 102. The data record may include identifying information corresponding to a user of the electronic device 102, and the message may include content that is separate from the data record. The electronic device 103 may provide the identifying information and content of the message for display in a user interface of a messaging application.

As described above, one aspect of the present technology is the gathering and use of data available from specific and legitimate sources for providing user information in association with messaging. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing information corresponding to a user in association with messaging. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing information corresponding to a user in association with messaging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
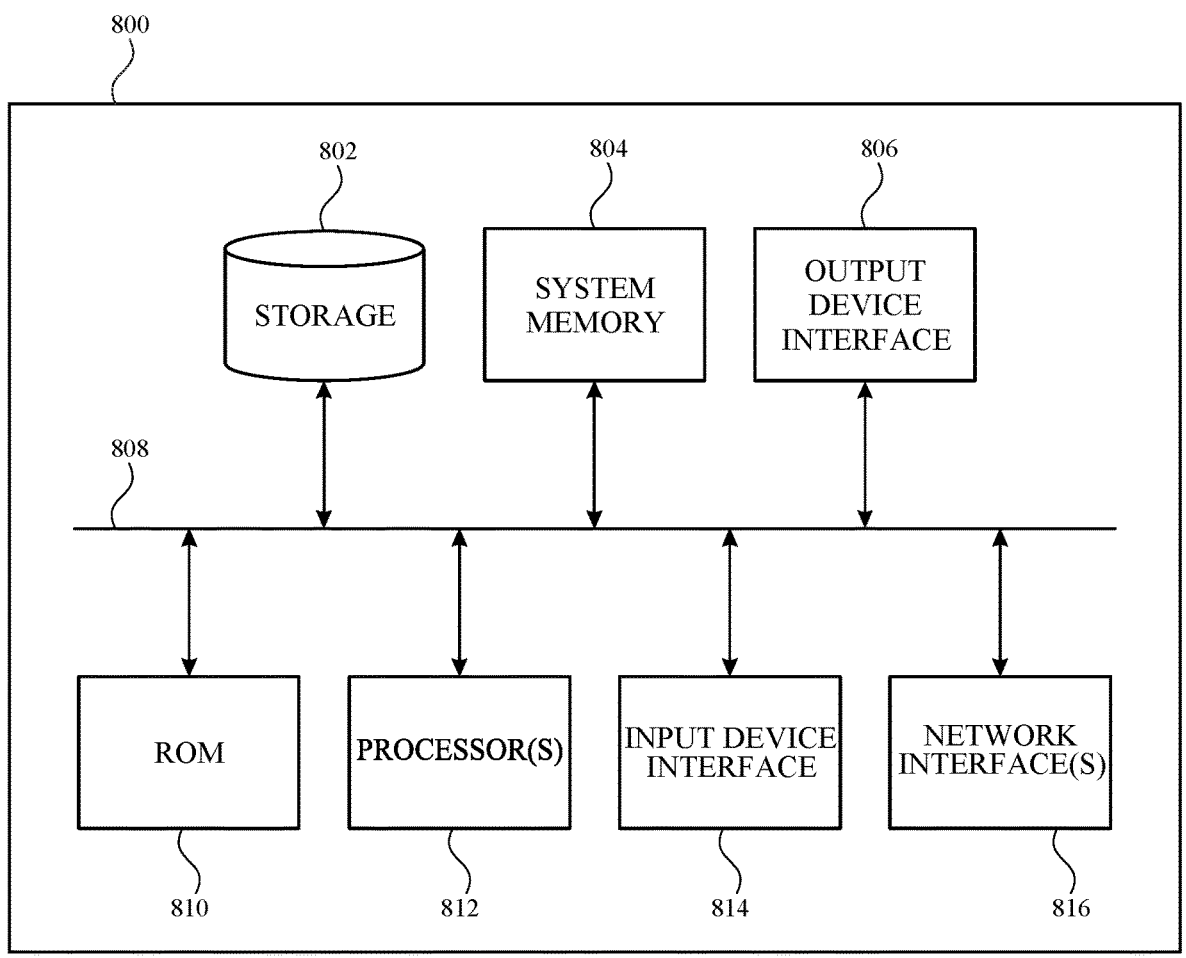
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-105, and/or one or the server 108 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 108 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving, by a messaging application on a first device, a message and associated metadata from a second device, the associated metadata comprising a record identifier of a data record stored on a server, the data record comprising identifying information corresponding to a user of the second device;
responsive to receipt of the message, sending, by the first device and to the server, a request for the data record, the request comprising the record identifier;
obtaining, by the first device and in response to the sending, the data record; and
displaying, by the first device, the identifying information of the user contained in the data record, together with content of the message in a user interface of the messaging application.

2. The method of claim 1, wherein displaying the identifying information of the user comprises displaying the identifying information of the user in place of existing identifying information of the user stored on the first device.

3. The method of claim 1, wherein the identifying information of the user of the second device comprises at least one of a name or a photo of the user of the second device.

4. The method of claim 1, wherein the second device is configured to send the associated metadata with the message to the first device, based on having sent a predetermined number of prior messages to the first device without including the associated metadata.

5. The method of claim 1, wherein the second device is configured to send the associated metadata with the message to the first device, based on user opt-in at the second device.

6. The method of claim 1, the associated metadata further comprising a key for decrypting the data record.

7. The method of claim 1, wherein the data record is associated with a cloud-based user account for the user of the second device.

8. The method of claim 1, further comprising:
receiving, by the messaging application, a second message and second associated metadata from the second device, the second associated metadata comprising a second record identifier of a second data record stored on the server, the second data record comprising second identifying information corresponding to the user of the second device;
sending, by the first device and to the server, a request for the second data record, the request for the second data record comprising the second record identifier of the data record;
obtaining, by the first device, the second data record; and
displaying, by the first device, the second identifying information of the user contained in the second data record, together with content of the second message in the user interface of the messaging application.

9. The method of claim 1, further comprising:
determining a hash value from the data record; and
verifying the data record based at least in part on a comparison between the hash value and the record identifier.

10. A computer program product comprising code, stored in a non-transitory computer-readable storage medium, the code comprising:
code to receive, by a messaging application on a first device, a message and associated metadata from a second device, the associated metadata comprising a record identifier of a data record stored on a server, the data record comprising identifying information corresponding to a user of the second device;
code to send, responsive to receipt of the message, by the first device, and to the server, a request for the data record, the request comprising the record identifier;
code to obtain, by the first device and in response to the sending, the data record; and
code to store, by the first device, the identifying information of the user in association with a user identifier corresponding to the user.

11. The computer program product of claim 10, wherein the code to store the identifying information of the user comprises code to store the identifying information of the user in place of existing identifying information of the user stored on the first device.

12. A device, comprising:
a memory; and
at least one processor circuit configured to:
receive, by a messaging application on a first device, a message and associated metadata from a second device, the associated metadata comprising a record identifier of a data record stored on a server, the data record comprising identifying information corresponding to a user of the second device;
responsive to receipt of the message, send, by the first device and to the server, a request for the data record, the request comprising the record identifier;
obtain, by the first device and in response to the sending, the data record; and
display, by the first device, the identifying information of the user contained in the data record, together with content of the message in a user interface of the messaging application.

13. The device of claim 12, wherein the at least one processor circuit is configured to display the identifying information of the user by displaying the identifying information of the user in place of existing identifying information of the user stored on the first device.

14. The device of claim 12, wherein the identifying information of the user of the second device comprises at least one of a name or a photo of the user of the second device.

15. The device of claim 12, wherein the second device comprises another processor circuit and is configured to send the associated metadata with the message to the first device, based on having sent a predetermined number of prior messages to the first device without including the associated metadata.

16. The device of claim 12, wherein the second device comprises another processor circuit and is configured to send the associated metadata with the message to the first device, based on user opt-in at the second device.

17. The device of claim 12, wherein the associated metadata further comprises a key for decrypting the data record.

18. The device of claim 12, wherein the data record is associated with a cloud-based user account for the user of the second device.

19. The device of claim 12, wherein the at least one processor circuit is further configured to:

receive, by the messaging application, a second message and second associated metadata from the second device, the second associated metadata comprising a second record identifier of a second data record stored on the server, the second data record comprising second identifying information corresponding to the user of the second device;

send, by the first device and to the server, a request for the second data record, the request for the second data record comprising the second record identifier of the data record;

obtain, by the first device, the second data record; and display, by the first device, the second identifying information of the user contained in the second data record, together with content of the second message in the user interface of the messaging application.

20. A system comprising:

a first device, comprising at least one processor circuit, configured to:

receive, by a messaging application on the first device, a message and associated metadata from a second device, the associated metadata comprising a record identifier of a data record stored on a server, the data record comprising identifying information corresponding to a user of the second device;

responsive to receipt of the message, send, by the first device and to the server, a request for the data record, the request comprising the record identifier;

obtain, by the first device and in response to the sending, the data record; and display, by the first device, the identifying information of the user contained in the data record, together with content of the message in a user interface of the messaging application.

21. The system of claim 20, wherein the identifying information of the user of the second device comprises at least one of a name or a photo of the user of the second device.

* * * * *

UNITED STATES PATENT AND TRADEMARK OFFICE
CERTIFICATE OF CORRECTION

| | | |
|---|---|---|
| PATENT NO. | : 12,361,143 B2 | Page 1 of 1 |
| APPLICATION NO. | : 16/888574 | |
| DATED | : July 15, 2025 | |
| INVENTOR(S) | : Nicholas J. Circosta et al. | |

It is certified that error appears in the above-identified patent and that said Letters Patent is hereby corrected as shown below:

On the Title Page

Item (56) Under Other Publications (Line 2): Replace "and BasedOn Block" with --and Based On Block--.

Signed and Sealed this
Fourteenth Day of October, 2025

John A. Squires
*Director of the United States Patent and Trademark Office*